C. A. LINDEN & C. A. CARLSON.
ELECTRIC WELDING TOOL.
APPLICATION FILED OCT. 6, 1911.
1,052,490.   Patented Feb. 11, 1913.
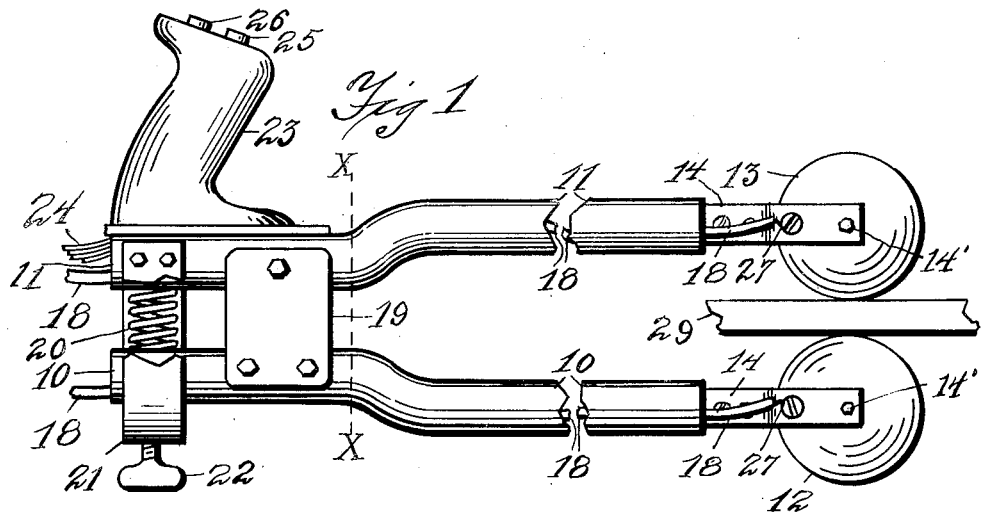
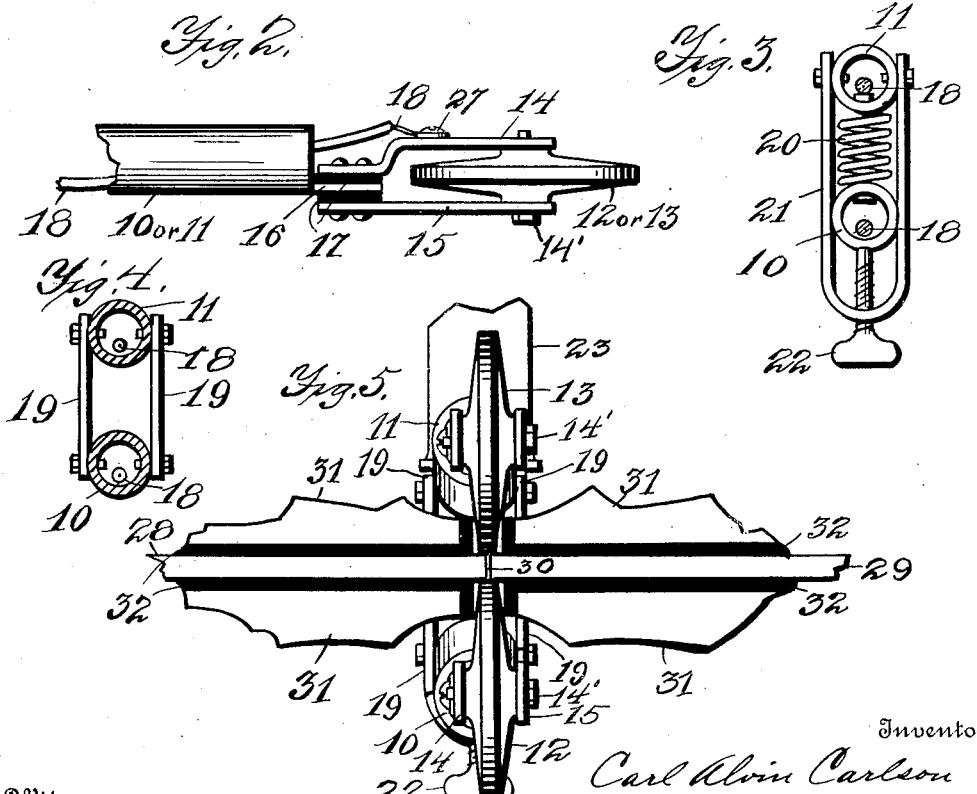

UNITED STATES PATENT OFFICE.

CHARLES A. LINDEN AND CARL ALVIN CARLSON, OF JAMESTOWN, NEW YORK.

ELECTRIC WELDING-TOOL.

1,052,490. Specification of Letters Patent. Patented Feb. 11, 1913.

Application filed October 6, 1911. Serial No. 653,254.

*To all whom it may concern:*

Be it known that we, CHARLES A. LINDEN and CARL ALVIN CARLSON, citizens of the United States, and residents of Jamestown, county of Chautauqua and State of New York, have invented new and useful Improvements in Electric Welding-Tools, of which the following, taken in connection with the accompanying drawing, is a specification.

The invention relates to tools for welding by electricity; and the object of our improvement is to provide an electric welding device which has spaced tubular arms with rotatable wheels oppositely placed on their outer ends and means for conducting electricity to said wheels, also providing means for accurately spacing the distance between said wheels; and the invention consists in the construction and arrangement of the parts as shown in this specification and the accompanying drawings, and pointed out in the claims.

In the drawings, Figure 1 is an elevation of the welding tool showing the tubular arms with the wheels on their outer ends and the plate to be welded between said wheels. Fig. 2 is a detail plan view of the outer end of one of said arms showing the manner of attaching the wheel thereto. Fig. 3 is a plan view of the adjusting device on the inner ends of the tubular arms. Fig. 4 is a sectional view at line X X in Fig. 1 showing the connecting plates for the arms. Fig. 5 is an elevation of the plates as held in suitable clamping jaws and showing the welding wheels in position for proceeding up the seam along the abutting edges of the sheet metal plates.

Like numerals of reference refer to corresponding parts in the several views.

The numeral 10 designates one of the tubular arms and the numeral 11 the other. The numeral 12 designates one wheel and the numeral 13 the other. The wheels 12 and 13 are revolubly mounted within plates 14 and 15 which are attached by means of suitable screws to a lug 16 on each tubular arm, insulation 17 being placed between the plates 14 and 15 and the lug 16 of the tubular arm, so that the electric current cannot pass into either of the tubular arms 10 or 11. The insulated wires 18 extend through the tubular arms 10 and 11 and are connected to a suitable means for supplying electricity. The arms 10 and 11 are connected by means of plates 19 which are rigidly attached to one of the arms and pivotally attached to the other arm so that the pivotally attached arm can be adjusted as to the distance between the wheels 12 and 13. The pivotal and rigid mounting of the arms 10 and 11 is accomplished in the present construction by means of two screws for each plate in arm 10 and one screw in arm 11.

The adjustment of the distance between the wheels 12 and 13 is accomplished by means of a clamp which consists of a spring 20 between the tubular arms 10 and 11 and a metal loop 21 which is preferably attached to the pivotally mounted arm 11 and extends around the other arm 10. A thumb screw 22 is mounted in the bend of the looped strip 21 and bears against the side of the arm 10. It is apparent that the spring 21 will press the arms 10 and 11 apart, thereby pressing the opposite ends and wheels 12 and 13 closer together on account of the pivotal mounting on plates 19, and that by means of the thumb screw 22 the distance between the wheels 12 and 13 may be accurately spaced. This is necessary in order that the wheels may have the correct contact with sheet metal plates differing as to thickness.

A handle 23 is provided on one of the arms 10 or 11, preferably on the upper arm, for controlling the tool, and wires 24 are provided extending through said handle 23 to switch buttons 25 and 26. The switch buttons 25 and 26 are connected by the wires 24 to a suitable magnetic switch so that the electric current can be turned off or on by simply pressing buttons 25 or 26. It is necessary to have a switch that operates as quickly as possible, otherwise the switch will be burned out by the electricity, hence a magnetically controlled switch is preferred.

The wires 18 are connected to plates 14 at 27. The plates 14 and 15 and wheels 12 and 13 are preferably made of copper. The edges of two plates 28 and 29 are placed abutting or lapping as at 30 and are held firmly in line by means of suitable clamping jaws 31, which are placed a sufficient distance apart to permit of the edges of the wheels 12 and 13 to be inserted therebetween on both sides of the abutting edges 30. The clamping jaws 31 have insulation 32 between said jaws and the plates 28 and 29 so that the electricity shall not escape through the jaws 31.

It is now apparent that the plates may be placed with edges abutting or lapping within the clamping jaws 31 and that the welding tool may be adjusted to the thickness of the plates 28 and 29 and, having been placed upon the plates, the electrical current may be turned on or off by means of the buttons 25 and 26, and the tool may be rolled along the seam thereby welding said plates together by the contact on opposite sides. The arms 10 and 11 may be of any desired length so that sheets of any desired width may be welded together. It is apparent also that softer metal may be placed between the abutting edges 30 of the plates 29 and melted and welded into the same by means of the electricity.

It is obvious that arms 10 and 11 may be made solid or non-tubular and obtain the purpose. If they are made of a strong conducting metal for electricity as for example copper, electricity may flow through the arms 10 and 11. It is preferred, however, for convenience in use that the arms 10 and 11 should be made in the tubular form. The wheels 12 and 13 are preferably made with broad surfaced hubs for contacting with the plates 14 and 15 so that the electricity will flow freely from the plate 14 into the wheel. The pin 14' upon which the wheel revolves is preferably made of bronze or hardened copper in order to present as slight resistance to the flow of electricity as possible.

We claim as new:

1. An electric welding tool comprising spaced tubular arms pivotally connected, wheels revolubly mounted on the outer ends of said arms one to each arm, a handle on one of said arms, electrical wire connection extending through said tubular arms to each of said wheels and mechanism for normally pressing said wheels upon the plates to be welded.

2. An electric welding tool comprising spaced tubular arms pivotally connected, wheels revolubly mounted on the outer ends of said arms, a handle on one of said arms, wire connection for electricity extending through said tubular arms to each of said wheels, means for pressing said wheels upon the plates to be welded, and magnetic switch press buttons on said handle to control said electric connection to said wheels.

3. An electric welding tool comprising spaced arms, one of said arms pivotally attached to the other a wheel rotatably mounted on the outer end of each of said arms, electric connection for each of said wheels, and a spring between the inner ends of said arms to normally press said wheels against the plates to be welded.

4. An electric welding tool comprising spaced arms, one of said arms pivotally attached to the other, a wheel rotatably mounted on the outer end of each of said arms, electric connection for each of said wheels, a spring between the inner ends of said arms to normally press said wheels toward one another, and means for holding said wheels a spaced distance apart.

5. An electric welding tool comprising spaced tubular arms pivotally connected, wheels revolubly mounted on the outer ends of said arms, a handle on one of said arms, wire connection for electricity extending through said tubular arms to each of said wheels and means for normally pressing said wheels toward one another, a loop attached to the inner end of one of said arms, and a set screw in said loop bearing against the inner end of one of said arms to adjust the spaced distance between said wheels, substantially as for the purpose specified.

In testimony whereof we have signed our names to this specification in the presence of two subscribing witnesses.

CHARLES A. LINDEN.
CARL ALVIN CARLSON.

Witnesses:
FAYE AGNEW,
L. T. BALDWIN.